Oct. 15, 1963     J. E. DRAIM     3,107,069
SPACE SUIT ATTITUDE CONTROL AND THRUSTING DEVICE
Filed Jan. 11, 1963

INVENTOR.
JOHN EMERY DRAIM

BY

*George J. Rubens*
ATTORNEY

United States Patent Office 3,107,069
Patented Oct. 15, 1963

3,107,069
SPACE SUIT ATTITUDE CONTROL AND
THRUSTING DEVICE
John E. Draim, 124 W. Woodland Drive, Sanford, Fla.
Filed Jan. 11, 1963, Ser. No. 250,965
7 Claims. (Cl. 244—4)
(Granted under Title 35, U.S. Code (1952), sec. 266)

The invention described herein may be manufactured and used by or for the Government of the United States of America for governmental purposes without the payment of any royalties thereon or therefor.

The present invention relates to thrust devices and more particularly to such a device capable of propulsion and attitude control of an astronaut in a weightless environment.

Astronauts recently have been placed into orbit around the earth enclosed within a relatively small capsule or space ship and have experienced a weightless condition therein. While in this confined enclosure, the astronaut has little difficulty in manually maneuvering his body about the cabin to perform his required tasks. However, in the very near future it is reasonable to assume that astronauts will be required to exit the confines of his space vehicle to assemble and repair space stations and perform other similar tasks, and while in such a weightless environment in space he will need means for propulsion and three axis and translational control, to which problem this invention is directed.

Rocket propulsion devices have been used to lift and transport a person for relatively short distances, such as is disclosed in U.S. Patent No. 3,021,095. In this patent the foot soldier supports on his back a rocket propulsion means having a pair of downwardly directed nozzles, one on each side of the individual. The nozzles are controlled to a limited degree by levers gripped in the hands of the user and connected to the nozzles by Bowden cables. In U.S. Patent 2,509,603, a single reaction nozzle is utilized for surface propulsion, the nozzle being guided in a limited accurate movement of controls gripped by both hands of the user.

The present invention provides a simple, light weight attitude and translational control device especially suitable for a weightless environment and capable of three axis maneuverability not possible with prior art devices. A unique feature of the invention, and one which greatly contributes to its simplicity and light weight is the mounting of the reaction nozzles on the back of the astronaut's hand or gloves of the space suit to allow directional control by merely "pointing" or orienting the hands with respect to his center of mass. In addition, such location of the nozzles on the back of the astronaut's hands frees his palms and fingers for other manual tasks instead of being preoccupied by gripping control levers. The discharge from nozzles can be readily controlled by a valve operable by a finger, preferably the thumb. By providing a reaction nozzle on each hand, each connected by a flexible hose to the source of reaction fluid, which may be carried on the astronaut's back, thrust vectors can be utilized around the center of mass of the astronaut to improve three axis rotation as well as three axis translational control.

One object of this invention is to provide a thrust control device for a person having three axis rotational control and/or three axis translational control.

Another object is to utilize the arms of the user to control attitude or orientation by "pointing" in an appropriate direction; and a corollary object is to mount the reaction nozzles on the back of the user's hands to free the hands for other tasks.

A further object is to utilize a thrust control device capable of use by an astronaut in a weightless environment for both three axis rotational control and three axis translational control.

Still other objects is to provide a thrust control for an astronaut which is simple, light weight, comfortable, and offers maximum maneuverability.

Other objects and many of the attendant advantages of this invention will be readily appreciated as the same becomes better understood by reference to the following detailed description when considered in connection with the accompanying drawings wherein.

Figure 1:
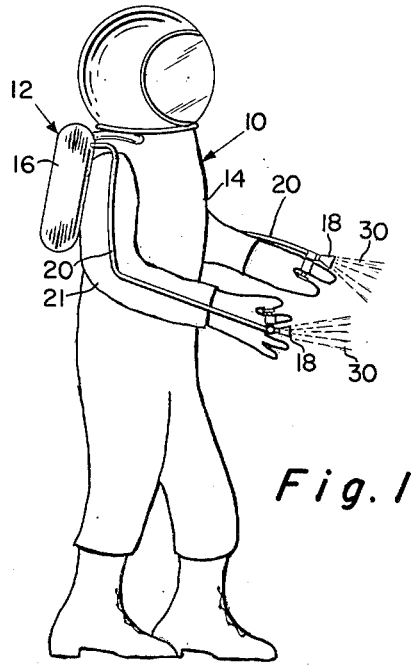
FIG. 1 is a front elevational diagrammatic view of an astronaut provided with the novel thrust control device of this invention.

Referring to the drawing where like reference numerals refer to similar parts throughout the figures there is shown in FIG. 1 an individual 10 supporting the novel thrust device 12 according to the present invention. As the invention is especially suitable for use in a weightless environment found in free space, the person is represented as an astronaut and the thrust device is strapped or otherwise suitably supported on the back of the space suit 14, or any other designated position on the astronaut's body.

The thrust device 10 comprises a source of reaction fluid, such as a bottle of compressed high pressure gas of air 16 or other conventional source, the details of which form no part of this invention. Although the gas source 16 is shown supported on the back of the astronaut, it might be desirable that the source be supported on an extremity or other part of the torso. A small conventional nozzle 18, such as of the De Lavel type, is supported on the back of a hand of the astronaut, preferably on the third knuckle of the index or middle finger by means of ring-like support 19 or the like. Maximum maneuverability is achieved by providing a nozzle for each hand of the astronaut, as illustrated. Each nozzle is connected to the source of high pressure gas by means of a flexible hose 20, preferably secured to a respective sleeve 21 along the longitudinal center line thereof to allow unrestricted arm movement, which apart from the consideration of comfort, is also important in order to achieve the maximum degree of maneuverability in a manner to be described. In the figures of the drawing, the mouth of each nozzle 18 is directed outwarly toward the finger tips of the hands, however, it is apparent that they can be directed in an opposite direction, namely, toward the body for a reason to be described. In each hose 20 adjacent the respective nozzle 18 is a variable opening control valve 22, controllable by a spring-loaded switch or plunger 24. Because of the location of each nozzle on the index or middle finger of each hand, switch 24 is readily controlled by lateral pressure exerted by the thumb 25. Although this particular location of the switch appears to be most convenient and desirable, it could be located between other fingers than the thumb. The thrust level from each nozzle is directly proportional to the opening of the valve 22, which in turn is directly proportional to the pressure exerted by the thumb on switch 24. Variable control valves 22 permit a high level of thrust for rapid rotation or translation, or a low level of thrust for slow rotation; or any in-between level as required.

FIGS. 3–7 inclusive diagrammatically illustrate various orientations of rotation or translation about the three orthogonal axis that can be achieved with the thrust device of the instant invention. In these figures the symbol 26 represents the approximate mass center of the body of the astronaut, and the three orthogonal axis X, Y and Z being appropriately designated, the X-axis in FIG. 3 lying normal to the paper of the drawing and passing through the center of mass.

Assuming the astronaut is in an approximate weightless condition, his clockwise rotation about the X axis, in the direction of arrow 28, is achieved by positioning his left hand in front across his chest above the mass center and directed toward the right shoulder, and his right hand is positioned in the opposite direction below the center of mass. His rate of rotation about the X axis is controlled by the degree of finger pressure exerted on switches 24. The exhaust gases 30 being emitted from the nozzles causes a reaction force to be exerted on the astronaut in the opposite direction, the torque about the center of mass from both nozzles being in the same direction to complement one another, rotating the astronaut clockwise around his center of mass.

Figures 3, 4, 6, 7:
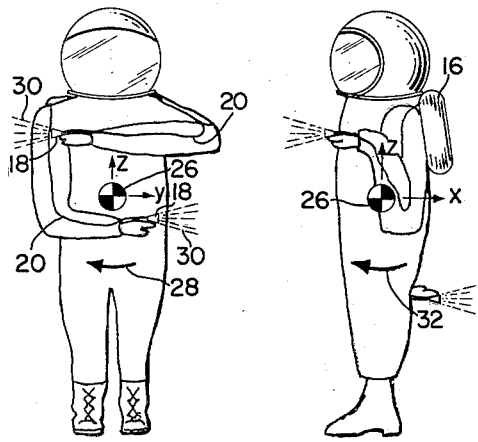
FIG. 3 is a front elevation of the astronaut with his arms oriented in front to provide a coupled rotation about the X axis in a clockwise direction.
FIG. 4 is a side elevation of the astronaut with his arms oriented directed forward to achieve rotation about the Y axis, also in a clockwise direction.
FIGS. 6 and 7 are similar side elevation views of the astronaut with his arms oriented to achieve translation along the X axis in rearward and forward directions, respectively.

In FIG. 4 the astronaut achieves rotation around the Y axis, in the direction of arrow 32, by placing both arms to his side, the left arm raised above the center of mass with his corresponding hand pointed horizontally forward. The right arm of the astronaut is placed below the center of mass and oriented rearwardly in the opposite direction than the other hand. As in the previous figure, the torque caused by each nozzle is complemented causing the astronauts to rotate clockwise around the Y axis. As in FIG. 3 the speed of rotation is controlled by pressure on switch 24.

Figure 5:
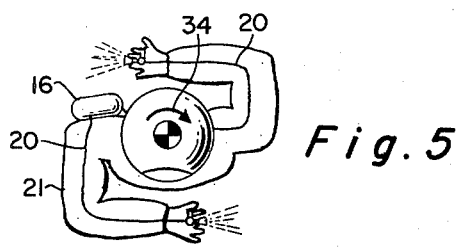
FIG. 5 is top plan view of the astronaut with his arms oriented in front and back to provide a rotation about the Z axis, also in a clockwise direction.

FIG. 5 illustrates clockwise rotation of the astronaut about the Z axis, in the direction of arrow 34 achieved by positioning his right arm in front of the mass center and his left arm to the rear of the mass center.

It is apparent that the astronaut in FIGS. 3–5 incl. could achieve an opposite rotation to that illustrated in FIGS. 3, 4 and 5 by merely reversing the position of his hands. While both arms suitably oriented provide a doubly coupled effect, it is apparent that the astronaut could utilize the thrust of only one nozzle, with the other nozzle otherwise oriented or occupied.

As well as achieving three axis rotational orientation as in FIGS. 3–5 incl., the astronaut with the present invention device can achieve three axis translational movement. For example, in FIG. 6 the astronaut is able to move in a linear direction rearwardly along the X axis (arrow 36) by positioning both arms in a plane containing his direction of travel passing through the center of mass and both hands directed forwardly. By directing his hand rearwardly, such as in FIG. 7, the astronaut can move linearly in a forward position, along arrow 38. It is apparent, without the need for illustration that by selective positioning of the hands the astronaut could move back and forth along the Y axis, and up and down in the Z axis.

Furthermore, it is apparent that the astronaut can move in any desired direction which may be a resultant of a combination of both rotational and translational movements obtained simultaneously by the appropriate orientation of his hands.

It is noted that by facing the mouth of the nozzles toward the finger tips, the reaction force exerted on the astronaut is in an opposite direction, and as can be observed in FIGS. 6 and 7 the astronaut moves in an opposite direction than that which his arms are pointing.

Figure 2:
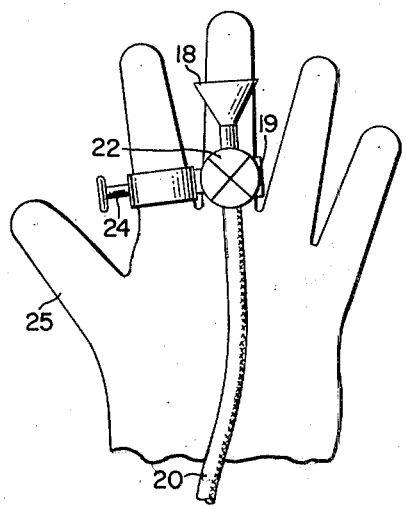
FIG. 2 is an enlarged plan view of the back of one of the astronaut's hands showing a De Lavel nozzle, and the means for control by the thumb of the user.

If this orientation should prove to be physiologically disadvantageous to the astronaut, the mouth of nozzle 18 could be mounted in an opposite direction to that illustrated in FIG. 2, namely toward the astronaut's wrist so that the reaction force would be in the same direction in which the hands are pointed.

The present invention provides a thrust device particularly suitable for an astronaut in a weightless environment and by utilizing a nozzle on each hand the astronaut is afforded maximum maneuverability in rotational and translational directions. By positioning the nozzle on the back of the hands of the astronaut the hands are not operationally encumbered during such movements, and are free to perform other tasks. The rate of these movements can be easily controlled by the astronaut by manipulation of a finger on each hand. By utilizing the hands of the astronaut in controlling orientation of movement, the thrust device can be simplified and reduced in size and weight, which factors are important considerations in space equipment.

Obviously many modifications and variations of the present invention are possible in the light of the above teachings. It is therefore to be understood that within the scope of the appended claims the invention may be practiced otherwise than as specifically described.

I claim:

1. A thrust and attitude control device for an individual, such as an astronaut, to be oriented in a plurality of orthogonal axes comprising:
   (a) a source of reaction fluid adapted to be supported on the individual;
   (b) a reaction nozzle supported on and lying on the back of each hand of the individual for discharging the fluid into the space environment to exert a propelling reaction force on the astronaut; and
   (c) flexible conduit means connecting said fluid source to the nozzle;
   (d) whereby the astronaut's positioning of his hand with respect to the center of mass of the individual will cause him to assume a corresponding orientation.

2. A thrust and attitude control device for an individual, such as an astronaut in a weightless environment to be oriented in a plurality of orthogonal axes comprising:
   (a) a source of reaction fluid adapted to be supported on the individual;
   (b) a reaction nozzle supported on and lying on the back of each hand of the individual for discharging the fluid into the space environment to exert a propelling reaction force on the astronaut;
   (c) flexible conduit means connecting said fluid source to the nozzle;
   (d) variable valve means located between the nozzle and the conduit means and operable by a finger of the individual;
   (e) whereby the astronaut's positioning of his hand with respect to the center of mass of the individual will cause him to assume a corresponding orientation.

3. A thrust and attitude control device for an individual, such as an astronaut in a weightless environment to be oriented in a plurality of orthogonal axes comprising:
   (a) a source of reaction fluid adapted to be supported on the individual;
   (b) a reaction nozzle supported on and lying on the back of each hand of the individual for discharging the fluid into the space environment to exert a propelling reaction force on the astronaut;
   (c) flexible conduit means connecting said fluid source to the nozzle;
   (d) variable valve means located between the nozzle and the conduit means, said valve means being mounted on the back of a finger of the respective hand and operable by another of said fingers;
   (e) whereby the astronaut's positioning of his hand with respect to the center of mass of the individual will cause him to assume a corresponding orientation.

4. A thrust and attitude control device for an individual, such as an astronaut in a weightless space environment, to be oriented rotationally and translationally in a plurality of orthogonal axes comprising:
   (a) a source of reaction fluid adapted to be supported on the individual;
   (b) a reaction nozzle supported and lying on the back of each hand of the individual for discharging the fluid into the space environment to exert a propelling reaction force on the astronaut, said nozzle having a longitudinal axis substantially parallel with the longitudinal axes of the astronaut's outstretched fingers;
   (c) flexible conduit means connecting said fluid source to each nozzle;
   (d) whereby orientation of the hands of the astronaut with respect to the center of mass of the individual will cause him to move in a rotational and/or translational direction.

5. A thrust and attitude control device for an individual, such as an astronaut in a weightless space environment, to be oriented rotationally and translationally in a plurality of orthogonal axes comprising:
   (a) a source of reaction fluid adapted to be supported on the individual;
   (b) a reaction nozzle supported on the back of each hand of the individual and directed inwardly toward the astronaut's body so that the propelling reaction force will be in the same direction that the hand is oriented, said nozzle having a longitudinal axis substantially parallel with the longitudinal axes of the astronaut's outstretched fingers;
   (c) flexible conduit means connecting said fluid source to each nozzle;
   (d) variable valve means located between each nozzle and the respective conduit means, said valve means being mounted on the back of the respective hand;
   (e) whereby orientation of the hands of the astronaut with respect to the center of mass of the individual will cause him to move in a rotational and/or translational direction.

6. A thrust and attitude control device for an individual, such as an astronaut in a weightless space environment, to be oriented rotationally and translationally in a plurality of orthogonal axes comprising:
   (a) a source of reaction fluid adapted to be supported on the individual;
   (b) a reaction nozzle supported on the back of each hand of the individual and directly outwardly away from the astronaut's body so that the propelling reaction force is in an opposite direction than that which the hand is oriented, said nozzle having a longitudinal axis substantially parallel with the longitudinal axes of the astronaut's outstretched fingers;
   (c) flexible conduit means connecting said fluid source to each nozzle;
   (d) each flexible conduct being secured along the longitudinal axis of the arm;
   (e) variable valve means located between each nozzle and the respective conduit means, said valve means being mounted on the back of a finger of the respective hand and operable by another of said fingers;
   (f) whereby orientation of the hands of the astronaut with respect to the center of mass of the individual will cause him to move in a rotational and/or translational direction.

7. A thrust and attitude control device for an astronaut wearing a space suit in a weightless space environment, to be oriented rotationally and translationally in a plurality of orthogonal axes comprising:
   (a) a source of reaction fluid adapted to be supported on the individual;
   (b) a reaction nozzle supported and lying on the back of each hand of the astronaut for discharging the fluid into the space environment to obtain a propelling reaction force therefrom, said nozzle having a longitudinal axis substantially parallel with the longitudinal axis of the astronaut's outstretched fingers;
   (c) flexible conduit means connecting said fluid source to each nozzle, said conduit means being attached to the suit along the arm and forearm sections thereof to permit unrestricted movement of the arms of the astronaut;
   (d) whereby orientation of the hands of the astronaut with respect to his center of mass will cause him to move in a rotational and/or translational direction.

References Cited in the file of this patent
UNITED STATES PATENTS

| | | |
|---|---|---|
| 2,209,861 | Torbert | July 30, 1940 |
| 3,066,887 | Moore | Dec. 4, 1962 |

OTHER REFERENCES

Popular Mechanics, vol. No. 112, page 76, July 1959.